US012659604B2

(12) United States Patent
Choi

(10) Patent No.: US 12,659,604 B2
(45) Date of Patent: Jun. 16, 2026

(54) ELECTRONIC DEVICE AND METHOD FOR CONVERTING MEASUREMENT DATA OF MULTISPECTRAL IMAGE SENSOR INTO COLOR SPACE UNDER ARBITRARY CORRELATED COLOR TEMPERATURE

(71) Applicant: SAMSUNG ELECTRONICS CO., LTD., Suwon-si (KR)

(72) Inventor: Heejin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/811,378

(22) Filed: Aug. 21, 2024

(65) Prior Publication Data

US 2025/0168521 A1 May 22, 2025

(30) Foreign Application Priority Data

Nov. 20, 2023 (KR) ........................ 10-2023-0160306

(51) Int. Cl.
H04N 23/88 (2023.01)
G06T 7/90 (2017.01)
H04N 23/12 (2023.01)

(52) U.S. Cl.
CPC .............. *H04N 23/88* (2023.01); *G06T 7/90* (2017.01); *H04N 23/12* (2023.01); *G06T 2207/10024* (2013.01); *G06T 2207/10036* (2013.01)

(58) Field of Classification Search
CPC ........ H04N 23/88; H04N 23/12; H04N 23/85; H04N 9/67; G06T 7/90;
(Continued)

(56) References Cited

U.S. PATENT DOCUMENTS

2005/0018226 A1* 1/2005 Chiba .................. H04N 1/6033
358/1.9
2019/0122342 A1* 4/2019 Bergner .................... G06T 5/70
(Continued)

FOREIGN PATENT DOCUMENTS

JP 2010 278711 A 12/2010
JP 2019 80100 A 5/2019
JP 2020 120204 A 8/2020

OTHER PUBLICATIONS

D. Andrew Rowlands, "Color conversion matrices in digital cameras: a tutorial", Optical Engineering, vol. 59 (11), DOI: 10.1117/1.OE.59.11.110801, Nov. 17, 2020, pp. 110801-1 to 110801-36 (36 pages total).
(Continued)

*Primary Examiner* — Albert H Cutler
(74) *Attorney, Agent, or Firm* — Sughrue Mion, PLLC

(57) ABSTRACT

Provided are an electronic device and a method of converting measurement data obtained by a multispectral image sensor (MIS) into a color space based on an arbitrary correlated color temperature (CCT). The method comprises obtaining reference transformation matrices configured to convert the measurement data obtained by of the MIS into a first color space based on each of reference CCTs, and, based on the reference transformation matrices, obtaining a target transformation matrix configured to convert the measurement data obtained by the MIS into the first color space based on a target CCT different from the reference CCTs.

20 Claims, 22 Drawing Sheets

GENERATE REFERENCE TRANSFORMATION MATRICES FOR CONVERTING MEASUREMENT DATA OF MIS INTO FIRST COLOR SPACE UNDER EACH OF REFERENCE CCTS — S301

GENERATE TARGET TRANSFORMATION MATRIX FOR CONVERTING MEASUREMENT DATA OF MIS INTO FIRST COLOR SPACE UNDER TARGET CCT DIFFERENT FROM REFERENCE CCTS, BASED ON REFERENCE TRANSFORMATION MATRICES — S302

(58) Field of Classification Search
CPC . G06T 2207/10024; G06T 2207/10036; G01J
3/462; G01J 3/457; G01J 3/506
See application file for complete search history.

(56) References Cited

U.S. PATENT DOCUMENTS

| | | | |
|---|---|---|---|
| 2019/0373232 A1* | 12/2019 | Brown | H04N 9/646 |
| 2022/0099564 A1* | 3/2022 | Xu | G01J 3/42 |
| 2023/0154049 A1* | 5/2023 | Wang | G06F 17/18 |
| | | | 345/589 |
| 2023/0325995 A1 | 10/2023 | Kim et al. | |
| 2024/0129446 A1* | 4/2024 | Qian | H04N 25/135 |
| 2024/0163410 A1 | 5/2024 | Ater et al. | |
| 2024/0386548 A1* | 11/2024 | Wang | G06T 3/40 |

OTHER PUBLICATIONS

A. R. Robertson, "Computation of Correlated Color Temperature and Distribution Temperature", Journal of Optical Society America, vol. 58, No. 11, Nov. 1968, pp. 1528-1535 (8 pages total).

* cited by examiner

GENERATE REFERENCE TRANSFORMATION MATRICES FOR CONVERTING MEASUREMENT DATA OF MIS INTO FIRST COLOR SPACE UNDER EACH OF REFERENCE CCTS —— S301

GENERATE TARGET TRANSFORMATION MATRIX FOR CONVERTING MEASUREMENT DATA OF MIS INTO FIRST COLOR SPACE UNDER TARGET CCT DIFFERENT FROM REFERENCE CCTS, BASED ON REFERENCE TRANSFORMATION MATRICES —— S302

FIG. 4

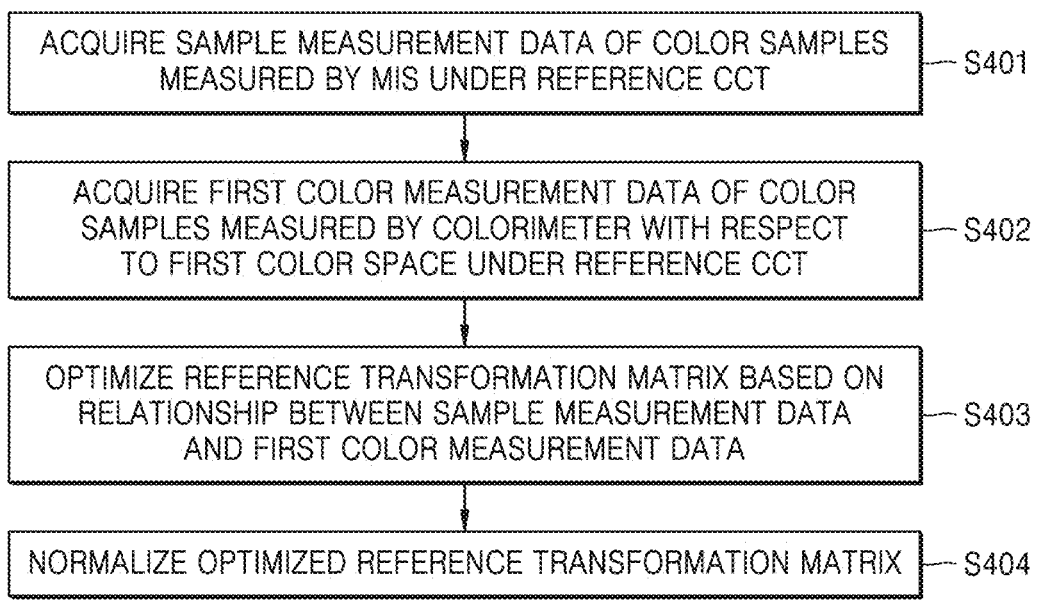

ACQUIRE SAMPLE MEASUREMENT DATA OF COLOR SAMPLES MEASURED BY MIS UNDER REFERENCE CCT    — S401

ACQUIRE FIRST COLOR MEASUREMENT DATA OF COLOR SAMPLES MEASURED BY COLORIMETER WITH RESPECT TO FIRST COLOR SPACE UNDER REFERENCE CCT    — S402

OPTIMIZE REFERENCE TRANSFORMATION MATRIX BASED ON RELATIONSHIP BETWEEN SAMPLE MEASUREMENT DATA AND FIRST COLOR MEASUREMENT DATA    — S403

NORMALIZE OPTIMIZED REFERENCE TRANSFORMATION MATRIX    — S404

FIG. 5

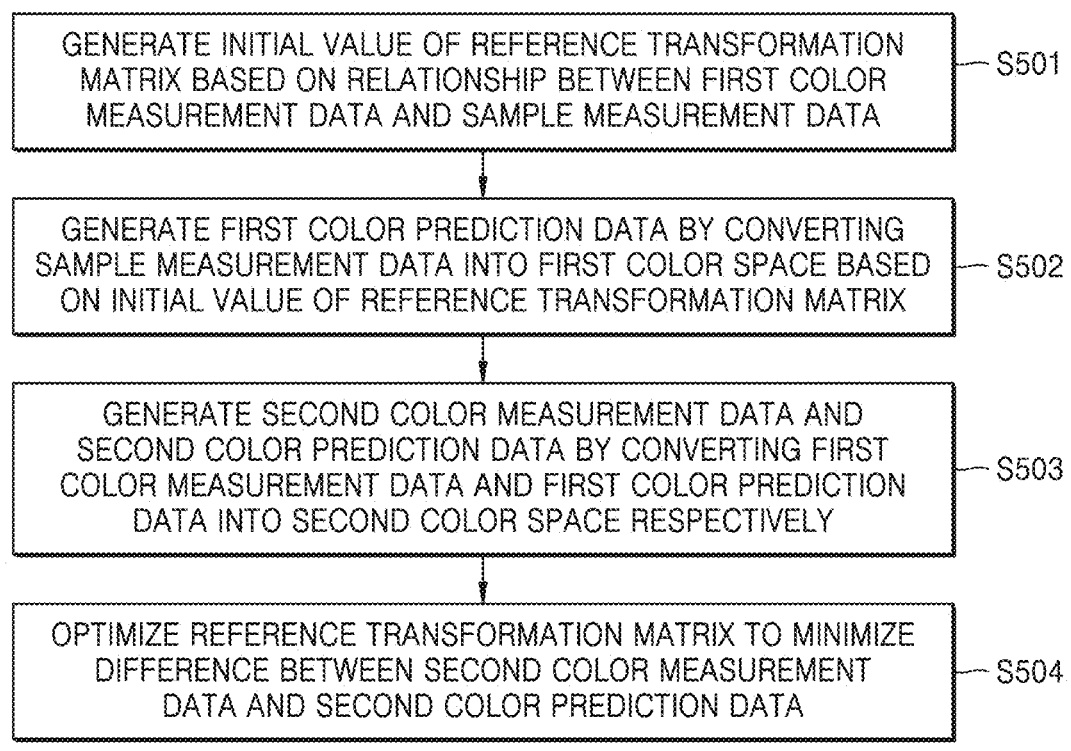

GENERATE INITIAL VALUE OF REFERENCE TRANSFORMATION MATRIX BASED ON RELATIONSHIP BETWEEN FIRST COLOR MEASUREMENT DATA AND SAMPLE MEASUREMENT DATA — S501

GENERATE FIRST COLOR PREDICTION DATA BY CONVERTING SAMPLE MEASUREMENT DATA INTO FIRST COLOR SPACE BASED ON INITIAL VALUE OF REFERENCE TRANSFORMATION MATRIX — S502

GENERATE SECOND COLOR MEASUREMENT DATA AND SECOND COLOR PREDICTION DATA BY CONVERTING FIRST COLOR MEASUREMENT DATA AND FIRST COLOR PREDICTION DATA INTO SECOND COLOR SPACE RESPECTIVELY — S503

OPTIMIZE REFERENCE TRANSFORMATION MATRIX TO MINIMIZE DIFFERENCE BETWEEN SECOND COLOR MEASUREMENT DATA AND SECOND COLOR PREDICTION DATA — S504

GENERATE REFERENCE TRANSFORMATION MATRICES FOR CONVERTING MEASUREMENT DATA OF MIS INTO FIRST COLOR SPACE UNDER EACH OF REFERENCE CONDITIONS —— S801

GENERATE TARGET TRANSFORMATION MATRIX FOR CONVERTING MEASUREMENT DATA OF MIS INTO FIRST COLOR SPACE UNDER TARGET CONDITION, BASED ON REFERENCE TRANSFORMATION MATRICES —— S802

5200

[Security]

5700

5800

1

ELECTRONIC DEVICE AND METHOD FOR CONVERTING MEASUREMENT DATA OF MULTISPECTRAL IMAGE SENSOR INTO COLOR SPACE UNDER ARBITRARY CORRELATED COLOR TEMPERATURE

CROSS-REFERENCE TO RELATED APPLICATION

This application claims priority to Korean Patent Application No. 10-2023-0160306, filed on Nov. 20, 2023, in the Korean Intellectual Property Office, the disclosure of which is incorporated by reference herein in its entirety.

BACKGROUND

1. Field

Example embodiments of the present disclosure relate to converting measurement data of a multispectral image sensor (MIS) into a color space.

2. Description of Related Art

Color conversion in an image sensor includes simultaneously processing channel signals recorded in an image sensor after passing through a color filter at each pixel and converting the channel signals into a signal corresponding to a color space that represents a color perceived by the human eyes.

With regard to color conversion of an MIS, a method of finding the correlation between a signal value of the image sensor and a value in the Commission Internationale de l'Elcairage (CIE) XYZ color space by using a multilayer perceptron (MLP) has been developed. However, this method requires a large amount of training data measured under various light sources, a large amount of calculations for color conversion, and a significant amount of memory space to load an MLP model.

Another method is to estimate a spectrum from the image sensor signal and then acquire the value in the CIE XYZ color space by using a color matching function (CMF). However, as there is generally no unique solution for estimating a high dimensional spectrum from a signal value of a low dimensional MIS, it may be mathematically very difficult to derive a solution applicable to all situations, and the estimation accuracy is relatively low.

SUMMARY

One or more example embodiments provide an electronic device and a method of converting measurement data of a multispectral image sensor (MIS) into a color space under an arbitrary correlated color temperature (CCT).

Additional aspects will be set forth in part in the description which follows and, in part, will be apparent from the description, or may be learned by practice of example embodiments.

According to an aspect of an example embodiment, there is provided a computer-implemented method of converting measurement data obtained by a multispectral image sensor (MIS) into a color space based on an arbitrary correlated color temperature (CCT), the computer-implemented method including obtaining reference transformation matrices configured to convert the measurement data obtained by the MIS into a first color space based on each of reference CCTs, and based on the reference transformation matrices,

2 obtaining a target transformation matrix configured to convert the measurement data obtained by the MIS into the first color space based on a target CCT different from the reference CCTs, wherein the obtaining of the reference transformation matrices includes obtaining sample measurement data of color samples measured by the MIS based on a reference CCT among the reference CCTs, obtaining first color measurement data of the color samples measured by a colorimeter with respect to the first color space based on the reference CCT, optimizing a reference transformation matrix based on a relationship between the sample measurement data and the first color measurement data, and normalizing the optimized reference transformation matrix, wherein a loss function for the optimizing comprises a regularization term based on a size of the reference transformation matrix.

The optimizing of the reference transformation matrix may include obtaining an initial value of the reference transformation matrix based on the relationship between the first color measurement data and the sample measurement data, obtaining first color prediction data by converting the sample measurement data into the first color space based on the initial value of the reference transformation matrix, obtaining second color measurement data and second color prediction data by converting the first color measurement data and the first color prediction data into a second color space, respectively, and optimizing the reference transformation matrix to minimize a difference between the second color measurement data and the second color prediction data.

The regularization term may correspond to one of an L1-norm of the reference transformation matrix and an L2-norm of the reference transformation matrix.

The normalizing of the optimized reference transformation matrix may include obtaining single measurement data of one of the color samples measured by the MIS based on the reference CCT, normalizing the single measurement data, and normalizing the reference transformation matrix based on the normalized single measurement data.

The single measurement data may include data of a brightest achromatic sample among the color samples measured by the MIS based on the reference CCT.

The normalizing of the single measurement data may include adjusting a size of the single measurement data such that a maximum value of elements of the single measurement data is 1.

The normalizing of the reference transformation matrix based on the normalized single measurement data may include adjusting a size of the reference transformation matrix such that data obtained by converting the normalized single measurement data into the first color space satisfies a predetermined condition.

The first color space may be a Commission Internationale de l'Elcairage (CIE) XYZ color space, and wherein the adjusting of the size of the reference transformation matrix may include adjusting the size of the reference transformation matrix such that a Y value of data obtained by converting the normalized single measurement data into the CIE XYZ color space is 1.

The obtaining of the target transformation matrix may include, based on the relationship between each of the reference CCTs and the target CCT, obtaining the target transformation matrix by interpolating the reference transformation matrices.

The obtaining of the target transformation matrix may include, among the reference CCTs, setting a reference transformation matrix of the reference CCT closest to the target CCT as the target transformation matrix.

According to another aspect of an example embodiment, there is provided a computer-implemented method of converting measurement data obtained by a multispectral image sensor (MIS) into a color space based on an arbitrary correlated color temperature (CCT), the computer-implemented method including obtaining sample measurement data of color samples measured by the MIS based on a reference CCT, obtaining first color measurement data of the color samples measured by a colorimeter with respect to a first color space based on the reference CCT, optimizing a reference transformation matrix based on a relationship between the sample measurement data and the first color measurement data, and normalizing the optimized reference transformation matrix, wherein a loss function for the optimizing comprises a regularization term based on a size of the reference transformation matrix.

The optimizing of the reference transformation matrix may include obtaining an initial value of the reference transformation matrix based on the relationship between the first color measurement data and the sample measurement data, obtaining first color prediction data by converting the sample measurement data into the first color space based on the initial value of the reference transformation matrix, obtaining second color measurement data and second color prediction data by converting the first color measurement data and the first color prediction data into a second color space, respectively, and optimizing the reference transformation matrix to minimize a difference between the second color measurement data and the second color prediction data.

The regularization term may correspond to one of an L1-norm of the reference transformation matrix and an L2-norm of the reference transformation matrix.

The normalizing of the optimized reference transformation matrix may include obtaining single measurement data of one of the color samples measured by the MIS based on the reference CCT, normalizing the single measurement data, and normalizing the reference transformation matrix based on the normalized single measurement data.

The normalizing of the reference transformation matrix based on the normalized single measurement data may include adjusting a size of the reference transformation matrix such that data obtained by converting the normalized single measurement data into the first color space satisfies a predetermined condition.

According to still another aspect of an example embodiment, there is provided an electronic device configured to convert measurement data obtained by a multispectral image sensor (MIS) into a color space based on an arbitrary correlated color temperature (CCT), the electronic device including a memory configured to store one or more instructions, and a processor configured to execute the one or more instructions to obtain sample measurement data of color samples measured by the MIS based on a reference CCT, obtain first color measurement data of the color samples measured by a colorimeter with respect to a first color space based on the reference CCT, optimize a reference transformation matrix based on a relationship between the sample measurement data and the first color measurement data, and normalize the optimized reference transformation matrix, wherein a loss function for the optimizing comprises a regularization term based on a size of the reference transformation matrix.

The processor may be further configured to obtain an initial value of the reference transformation matrix based on the relationship between the first color measurement data and the sample measurement data, obtain first color prediction data by converting the sample measurement data into the first color space based on the initial value of the reference transformation matrix, obtain second color measurement data and second color prediction data by converting the first color measurement data and the first color prediction data into a second color space respectively, and optimize the reference transformation matrix to minimize a difference between the second color measurement data and the second color prediction data.

The regularization term may correspond to one of an L1-norm of the reference transformation matrix and an L2-norm of the reference transformation matrix.

The processor may be further configured to obtain single measurement data of one of the color samples measured by the MIS based on the reference CCT, normalize the single measurement data, and normalize the reference transformation matrix based on the normalized single measurement data.

The processor may be further configured to adjust a size of the reference transformation matrix such that data obtained by converting the normalized single measurement data into the first color space satisfies a predetermined condition.

BRIEF DESCRIPTION OF THE DRAWINGS

The above and other aspects, features, and advantages of example embodiments of the disclosure will be more apparent from the following description taken in conjunction with the accompanying drawings, in which:

FIG. 4 is a flowchart of a method of generating a reference transformation matrix according to an example embodiment;

FIG. 5 is a flowchart of a method of optimizing a reference transformation matrix according to an example embodiment;

DETAILED DESCRIPTION

Figure 1:
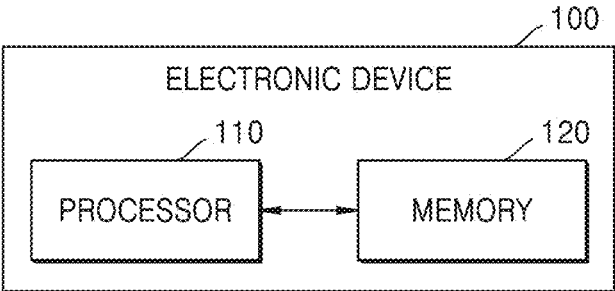
FIG. 1 is a block diagram of a first electronic device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, an expression, "at least one of a, b, and c" should be understood as including only a, only b, only c, both a and b, both a and c, both b and c, or all of a, b, and c.

The terms used in these embodiments are selected as widely used general terms as possible while considering functions in these embodiments, but these may vary depending on the intention or precedent of a technician skilled in the art, the emergence of a new technology, and the like. In addition, in certain cases, there are arbitrarily selected terms, and in this case, the meaning will be described in detail in the description of the embodiment. Therefore, the terms used in these embodiments should be defined based on the meaning of the terms and the overall content of these embodiments, not on the name of the simple terms.

Singular expressions include plural expressions unless context clearly means otherwise. In addition, when a part "includes" a component, this means that it may contain other components, rather than excluding other components, unless otherwise stated. The wording "substantially the same" may be widely interpreted as encompassing the same and similar unless the context clearly means differently.

Hereinafter, embodiments will be described in detail with reference to the accompanying drawings so that a person of ordinary skill in the art may easily implement the embodiments. However, the inventive concept may be implemented in various different forms and is not limited to the embodiments described herein.

FIG. 1 is a block diagram of a first electronic device 100 according to an example embodiment.

The first electronic device 100 may include components configured to convert measurement data acquired by a multispectral image sensor (MIS) into a color space. The first electronic device 100 may be a computer, a personal computer (PC), or a laptop, but is not limited thereto.

The first electronic device 100 may receive and process the measurement data acquired by the MIS from the outside. According to another example embodiment, when the first electronic device 100 includes the MIS, the measurement data acquired by the MIS included in the first electronic device 100 may be processed.

The first electronic device 100 may include a processor 110 that executes instructions configured to convert the measurement data of the MIS into the color space and a memory 120 that stores the instructions.

The processor 110 may be a Central Processing Unit (CPU), Application Processor (AP), Digital Signal Processor (DSP), Graphics Processing Unit (GPU), Vision Processing Unit (VPU), or Neural Processing Unit (NPU), but is not limited thereto. The memory 120 may include on-chip memory, cache memory, Random Access Memory (RAM), Read Only Memory (ROM), flash memory, Solid State Drive (SSD), Hard Disk Drive (HDD), or Optical Disc Drive (ODD), but is not limited thereto.

The processor 110 may generate (obtain) reference transformation matrices configured to convert the measurement data of the MIS into the color space under reference correlated color temperatures (CCTs). For example, the processor 110 may generate a reference transformation matrix by acquiring sample measurement data of color samples measured by the MIS under a reference CCT, acquiring color measurement data of color samples measured by a colorimeter under the reference CCT, optimizing the reference transformation matrix based on the relationship between the sample measurement data and the color measurement data, and normalizing the optimized reference transformation matrix.

The memory 120 may store reference transformation matrices generated by the processor 110.

Figure 2:
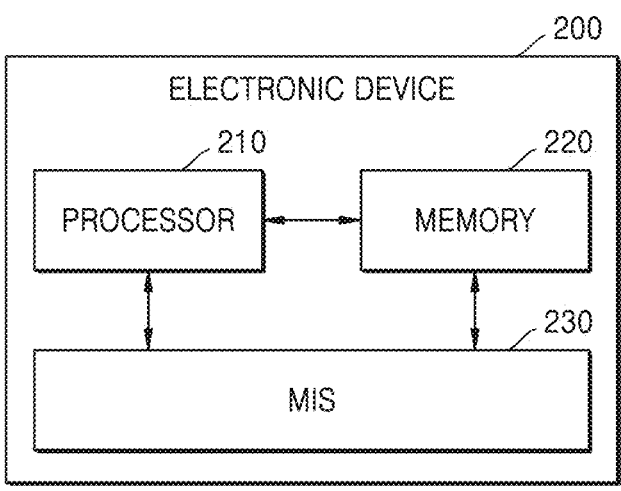
FIG. 2 is a block diagram of a second electronic device according to an example embodiment.

FIG. 2 is a block diagram of a second electronic device 200 according to an example embodiment.

The second electronic device 200 may be a device configured to convert measurement data acquired by of a MIS 230 into a color space under an arbitrary CCT. The second electronic device 200 may be, for example, a computer, a PC, a laptop, a smart phone, a mobile phone, a tablet, a smart tablet, a digital camera, a camcorder, a home appliance, a robot, a car, etc., but is not limited thereto.

The second electronic device 200 may include a processor 210 that performs instructions configured to convert the measurement data of the MIS 230 into the color space, a memory 220 that stores the instructions, and the MIS 230.

The processor 210 may be a CPU, an AP, a DSP, a GPU, a VPU, or a NPU, but is not limited thereto. The memory 220 may be on-chip memory, cache memory, RAM, ROM, flash memory, SSD, HDD, or ODD, but is not limited thereto.

The MIS 230 may include a complementary metal oxide semiconductor (CMOS) image sensor, a charge coupled device (CCD) image sensor, or a single photon avalanche sensor (SPAD).

The MIS 230 may include a multispectral filter array (MSFA) that transmits light for each band in each channel. The MSFA may have a one-dimensional or two-dimensional array. For example, when the number of channels is 16, the MSFA may be a 4×4 array.

A filter of each channel may transmit light of a specific band. To this end, the filter may have a resonance structure. A transmission band of the filter may be determined according to the resonance structure. For example, the transmission band may be adjusted according to a material of a reflective layer, a material of a cavity, and a thickness of the cavity. The filter may be implemented by grating, a nanostructure, a distributed Bragg reflector (DBR), or another method.

Figure 10:
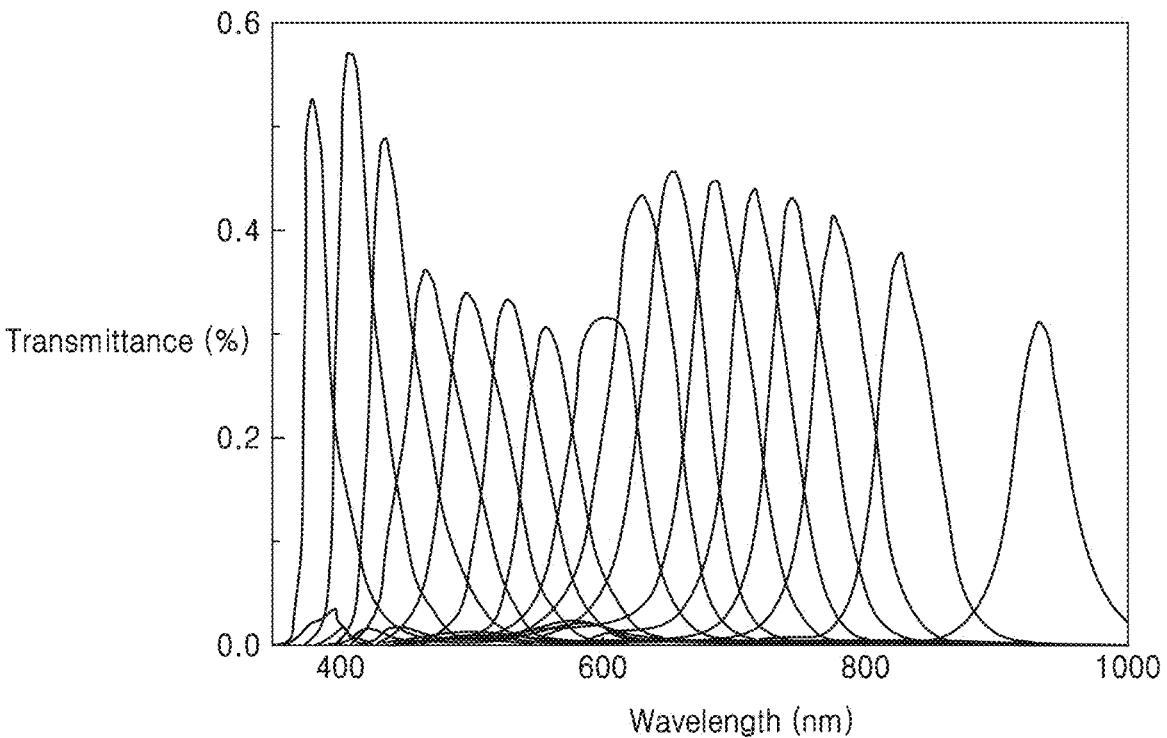
FIG. 10 is a diagram showing a wavelength spectrum of a MIS according to an embodiment.

The number of channels of the MIS 230 may be 4 or more. For example, the MIS 230 may include 16 channels as shown in FIG. 10. The entire band of the MIS 230 may include a visible light band. For example, the MIS 230 may generate images of 16 channels within a wavelength range of about 10 nm to about 1000 nm.

The processor 210 may convert measurement data of the MIS 230 acquired under an arbitrary CCT into a color space. For example, the processor 210 may generate a target transformation matrix corresponding to the CCT of the measurement data of the MIS 230 based on reference transformation matrices, and convert the measurement data of the MIS 230 into the color space by using the target transformation matrix.

The processor 210 may use the reference transformation matrices previously stored in the memory 220 to generate the target transformation matrix. According to another example embodiment, when the second electronic device 200 includes a function of the first electronic device 100 of FIG. 1, the processor 210 may generate the reference transformation matrices and generate the target transformation matrix by using the generated reference transformation matrices.

Figure 3:
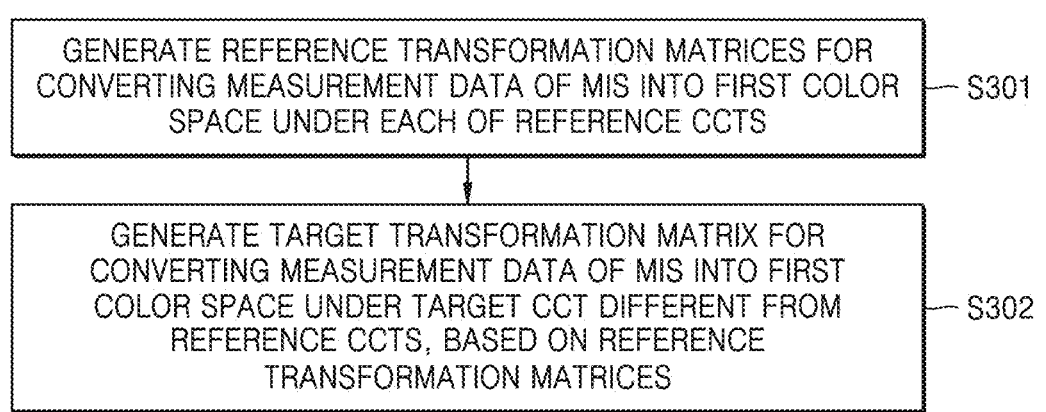
FIG. 3 is a flowchart of a method of converting measurement data acquired by a multispectral image sensor (MIS) into a color space under an arbitrary correlated color temperature (CCT) according to an example embodiment.

FIG. 3 is a flowchart of a method of converting measurement data acquired by a MIS into a color space under an arbitrary CCT according to an example embodiment.

In operation S301, a processor may generate target transformation matrices configured to convert the measurement data acquired by the MIS into a first color space under each of reference CCTs.

The first color space may be an absolute color space. For example, the first color space may be a Commission Internationale de l'Elcairage (CIE) XYZ color space, but is not limited thereto.

The reference CCT may be a CCT that serves as a reference configured to convert the measurement data acquired by the MIS to the first color space under the arbitrary CCT. The reference CCTs may be different. The reference CCTs may be implemented by different illuminants or different light sources. For example, a reference CCT of 5003 K may be generated by a standardized illuminant of D50, and a reference CCT of 6504 K may be generated by a standardized illuminant of D65.

The reference transformation matrix may be a transformation matrix configured to convert the measurement data acquired by the MIS acquired under the reference CCT into the first color space. For example, with regard to the measurement data acquired by the MIS under the standardized illuminant of D50, the processor may generate a reference transformation matrix corresponding to the reference CCT of 5003 K.

In operation S302, the processor may generate a target transformation matrix configured to convert the measurement data acquired by the MIS into the first color space under a target CCT different from the reference CCTs, based on the reference transformation matrices.

The target CCT may be an arbitrary CCT determined by an environment in which the MIS acquires the measurement data. The processor may determine the target CCT through image processing on the measurement data acquired by the MIS. The processor may perform white balancing on the measurement data acquired by the MIS and determine the target CCT from a white balance result.

The processor may generate the target transformation matrix based on the relationship between the reference CCTs and the target CCT.

The processor may generate the target transformation matrix by interpolating the reference transformation matrices based on the relationship between the reference CCTs and the target CCT. The processor may use linear interpolation, polynomial interpolation, spline interpolation, etc., but is not limited thereto. For example, when the reference transformation matrix of the reference CCT of 5003 K is P, the reference transformation matrix of the reference CCT of 6504 K is Q, and the target CCT is determined to be 6300 K, processor may generate the target transformation matrix corresponding to 6300 K by linearly interpolating P and Q.

According to another example embodiment, the processor may set a reference transformation matrix corresponding to a reference CCT closest to the target CCT as the target transformation matrix. For example, when the reference transformation matrix of the reference CCT of 5003 K is P, the reference transformation matrix of the reference CCT of 6504 K is Q, and the target CCT is determined to be 6300 K, the processor may set Q as the target transformation matrix.

Operations S301 and S302 may be performed by one electronic device. For example, operations S301 and S302 may be performed by the second electronic device 200 of FIG. 2. According to another example embodiment, operations S301 and S302 may be respectively performed by different electronic devices. For example, operation S301 may be performed by the first electronic device 100 of FIG. 1, and operation S302 may be performed by the second electronic device 200 of FIG. 2.

FIG. 4 is a flowchart of a method of generating a reference transformation matrix according to an example embodiment.

The processor may generate reference transformation matrices by performing operations S401 to S404 with respect to different reference CCTs, respectively. The method of generating the reference transformation matrix with respect to any one reference CCT among different reference CCTs is described.

In operation S401, the processor may acquire sample measurement data of color samples measured by a MIS under a reference CCT.

The color samples may be samples of a color chart. For example, when the MIS captures a Macbeth chart under a cool white fluorescent (CWF) standardized illuminant having a reference CCT of 4150 K, the processor may acquire the measurement data acquired by the MIS as the sample measurement data.

In operation S402, the processor may acquire first color measurement data of color samples measured by a colorimeter with respect to a first color space under the reference CCT.

The first color space may be an absolute color space. For example, the first color space may be a CIE XYZ or ICtCp color space, but is not limited thereto.

The colorimeter may be a tool for measuring color with respect to the first color space. The colorimeter may measure the same color samples as the color samples in operation S401 under the same reference CCT as the reference CCT in operation S401. For example, when the colorimeter captures the Macbeth chart under the CWF standardized illuminant having a reference CCT of 4150 K, the processor may acquire measurement data of the colorimeter as first color measurement data.

In operation S403, the processor may optimize the reference transformation matrix based on the relationship between the sample measurement data and the first color measurement data.

The processor may optimize the reference transformation matrix so that a difference between sample measurement data and first color measurement data on a second color space is minimized. For example, the second color space may be a color space different from the first color space, and may be a color space that is optically more uniformly distributed than the first color space. For example, the second color space may be a CIE Lab or DE2000 color space, but is not limited thereto.

Color data may be expressed as three values, such as XYZ and Lab, in the color space, and measurement data acquired by the MIS having 4 or more channels is expressed as four or more values. Because the measurement data acquired by the MIS has a higher dimension than the color data of the color space, there is generally no unique solution in the transformation matrix configured to convert the measurement data acquired by the MIS into the color space. As a way to solve this problem, in the present disclosure, the processor may generate a reference transformation matrix based on optimization. In addition, the processor may optimize the reference transformation matrix by minimizing a loss function including a regularization term to prevent the optimized reference transformation matrix from overfitting to a specific illuminant.

In operation S404, the processor may generate the reference transformation matrix by normalizing the reference transformation matrix optimized in operation S403.

The target transformation matrix may be generated by interpolating the reference transformation matrices, and to this end, the reference transformation matrices need to be normalized. Accordingly, the processor normalizes the optimized reference transformation matrix.

FIG. 5 is a flowchart of a method of optimizing a reference transformation matrix according to an example embodiment.

In operation S501, a processor may generate an initial value of the reference transformation matrix based on the relationship between first color measurement data and sample measurement data.

The first color measurement data may be acquired in operation S402 of FIG. 4, and the sample measurement data may be acquired in operation S401 of FIG. 4.

The processor may generate the initial value of the reference transformation matrix according to Equation 1.

$$T = AB^T(BB^T)^{-1} \qquad \text{[Equation 1]}$$

In Equation 1, T is the reference transformation matrix, A is the first color measurement data, and B is the sample measurement data. When the first color space is a CIE XYZ color space, the number of color samples is n, and the number of MIS channels is N, A and B may be expressed as Equation 2.

$$A = \begin{bmatrix} X_1 & \dots & X_n \\ Y_1 & \dots & Y_n \\ Z_1 & \dots & Z_n \end{bmatrix}, B = \begin{bmatrix} I_{1,1} & \dots & I_{1,n} \\ \vdots & \ddots & \vdots \\ I_{N,1} & \dots & I_{N,n} \end{bmatrix} \qquad \text{[Equation 2]}$$

In Equation 2, $I_{x,y}$ is a measurement value of an xth channel of a MIS with respect to a yth color sample, $X_i$ is an X value with respect to an ith color sample, $Y_i$ is a Y value with respect to an ith color sample, and $Z_i$ is a Z value with respect to an ith color sample.

In operation S502, the processor may generate first color prediction data by converting the sample measurement data into the first color space based on the initial value of the reference transformation matrix.

The processor may convert the sample measurement data acquired in operation S401 of FIG. 4 into the first color space by using the reference transformation matrix having the initial value generated in operation S501.

The processor may generate the first color prediction data according to Equation 3.

$$A_p = TB \qquad \text{[Equation 3]}$$

In Equation 3, $A_p$ is the first color prediction data, T is an initial reference transformation matrix generated according to Equation 1, and B is the sample measurement data.

In operation S503, the processor may generate second color measurement data and second color prediction data by converting the first color measurement data and the first color prediction data into the second color space respectively.

The second color space is a color space different from the first color space, and may be a color space that is optically more uniformly distributed than the first color space. For example, the second color space may be a CIE Lab or DE2000 color space, but is not limited thereto.

The processor may convert the first color measurement data of the first color space into the second color space and convert the first color prediction data of the first color space into the second color space. For example, the processor may generate second color measurement data by converting the first color measurement data of the CIE XYZ color space into the CIE Lab color space, and generate second color prediction data by converting the first color prediction data of the CIE XYZ color space into the CIE Lab color space.

In operation S504, the processor may optimize the reference transformation matrix to minimize a difference between the second color measurement data and the second color prediction data.

When the number of color samples is n, and the number of MIS channels is N, the second color measurement data may be a 3×n matrix, and the second color prediction data may be an N×n matrix. Accordingly, the reference transformation matrix may be a 3×N matrix.

When optimizing a 3×N reference transformation matrix, the optimized reference transformation matrix may be overfitting to a specific illuminant (i.e., a specific CCT). To prevent this, the processor may optimize the reference transformation matrix by minimizing a loss function having a regularization term.

The processor may optimize the reference transformation matrix to minimize the loss function defined as Equation 4.

$$L = \underset{T}{\text{argmin}}\left(\sqrt{\sum(Lab_m - Lab_p)^2} + \lambda\sum_{i,j}x_{i,j}^2\right) \qquad \text{[Equation 4]}$$

In Equation 4, L is the loss function, $Lab_m$ is the second color measurement data, and $Lab_p$ is the second color prediction data. The loss function L may be set to minimize a mean squared error (MSE) of the second color measurement data $Lab_m$ and the second color prediction data $Lab_p$. In Equation 4, A is a hyperparameter, and $x_{i,j}$ is values of an i row and a j column of the reference transformation matrix. In optimizing Equation 4, the processor may use the initial reference transformation matrix generated in operation S501 as an initial value.

In Equation 4, the loss function includes a regularization term representing an L2-norm of the reference transformation matrix. According to another example embodiment, the loss function may include a regularization term representing an L1-norm of the reference transformation matrix.

Figure 6:
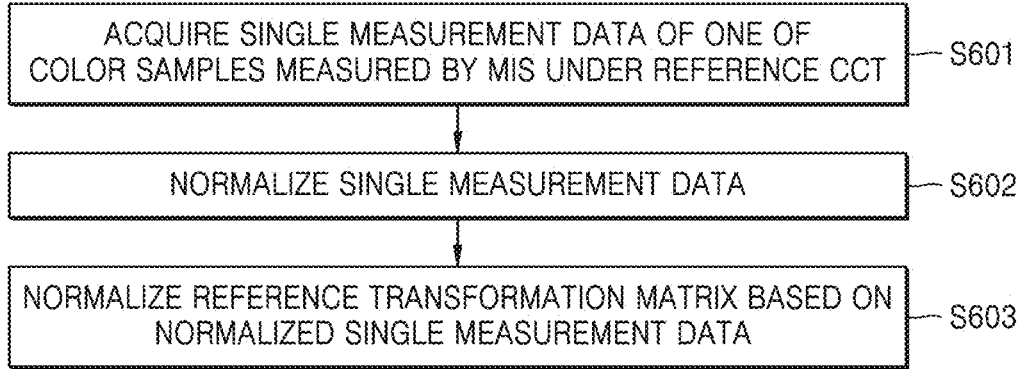
FIG. 6 is a flowchart of a method of normalizing a reference transformation matrix according to an example embodiment.

FIG. 6 is a flowchart of a method of normalizing a reference transformation matrix according to an example embodiment.

In operation S601, a processor may acquire single measurement data of one of color samples measured by a MIS under a reference CCT.

The single measurement data may be data of the brightest achromatic sample among the color samples measured by the MIS.

In operation S602, the processor may normalize the single measurement data.

The processor may adjust the size of the single measurement data such that the maximum value of the single measurement data has a predetermined size. The predetermined size may be 1, but is not limited thereto. For example, when the single measurement data is $[I_1; \ldots; I_N]$ (N is the number of channels of the MIS, and $I_x$ is a measurement value of an xth channel), the processor may scale the single measurement data to satisfy max $\{I_1, \ldots, I_N\}=1$.

When the brightest achromatic sample among the color samples is a white point (WP) of a specific light source, the measurement value of the MIS may be saturated, and max $\{I_1, \ldots, I_N\}=1$ may be expected.

In operation S603, the processor may normalize the reference transformation matrix based on the single measurement data normalized in operation S602.

The processor may adjust the size of the reference transformation matrix such that data acquired by converting the single measurement data normalized in operation S602 into a first color space satisfies a predetermined condition.

When the first color space is a CIE XYZ color space, the processor may scale the reference transformation matrix such that a Y value of the data acquired by converting the normalized single measurement data into the CIE XYZ color space is 1.

For example, it is assumed that the MIS measures a WP of a D65 standardized illuminant under the D65 standardized illuminant. The processor may normalize the single measurement data $[I_1(WP); \ldots; I_N(WP)]$ and the reference transformation matrix T such that Equation 5 satisfies a condition of Equation 6.

$$\begin{bmatrix} X(WP) \\ Y(WP) \\ Z(WP) \end{bmatrix}_{D65} = T \cdot \begin{bmatrix} I_1(WP) \\ \vdots \\ I_N(WP) \end{bmatrix}_{D65} \qquad \text{[Equation 5]}$$

$$\max\{I_1(WP), \ldots, I_N(WP)\} = 1, \; Y(WP) = 1 \qquad \text{[Equation 6]}$$

Figure 7:
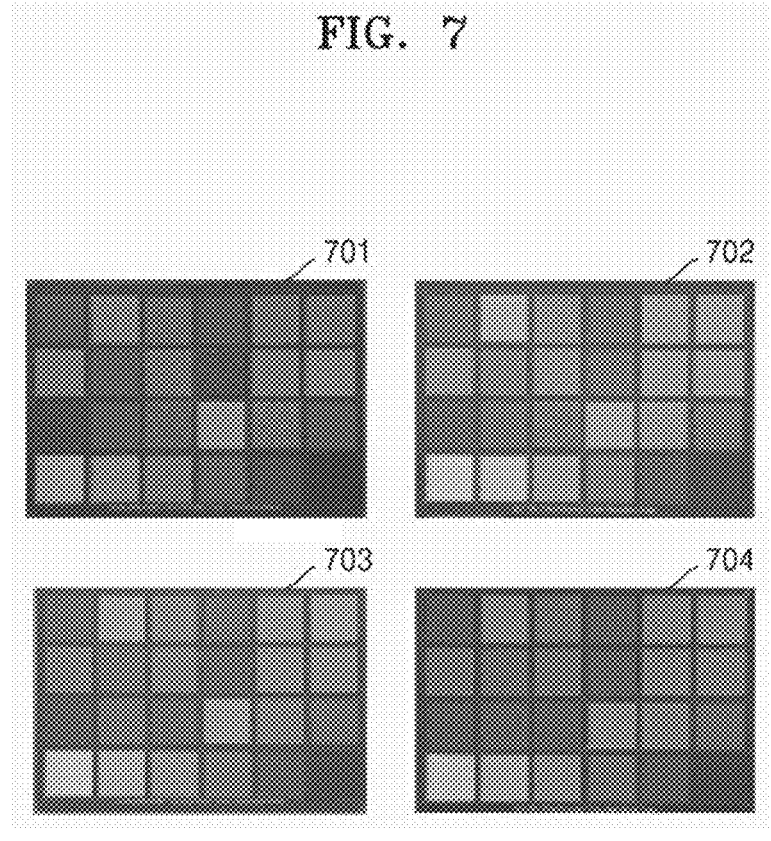
FIG. 7 shows experimental results of converting measurement data acquired by a MIS into a color space under an arbitrary CCT according to an example embodiment.

FIG. 7 shows first to fourth results 701 to 704 of an experiment of converting measurement data acquired by a MIS into a color space under an arbitrary CCT according to an example embodiment.

The experiment was performed to generate reference transformation matrices according to the method provided by the disclosure, and to convert the measurement data acquired by the MIS into the color space under four arbitrary CCTs by using the generated reference transformation matrices. 2300K of a horizon (HZ) illuminant, 2860K of an A illuminant, 4150K of a CWF illuminant, and 6500K of a D65 illuminant were set as four target CCTs.

The first result 701 represents a result of converting the measurement data acquired by the MIS measuring color samples under the HZ illuminant into the color space according to the method according to an example embodiment. The second result 702 represents a result of converting the measurement data acquired by the MIS measuring color samples under the A illuminant into the color space according to the method according to an example embodiment. The third result 703 represents a result of converting the measurement data acquired by the MIS measuring color samples under the CWF illuminant into the color space according to the method according to an example embodiment. The fourth result 704 represents a result of converting the measurement data acquired by the MIS measuring color samples under the D65 illuminant into the color space according to the method according to an example embodiment.

From the first to fourth results 701 to 704, it may be seen that the measurement data acquired by the MIS was converted into the color space according to each CCT.

Figure 8:
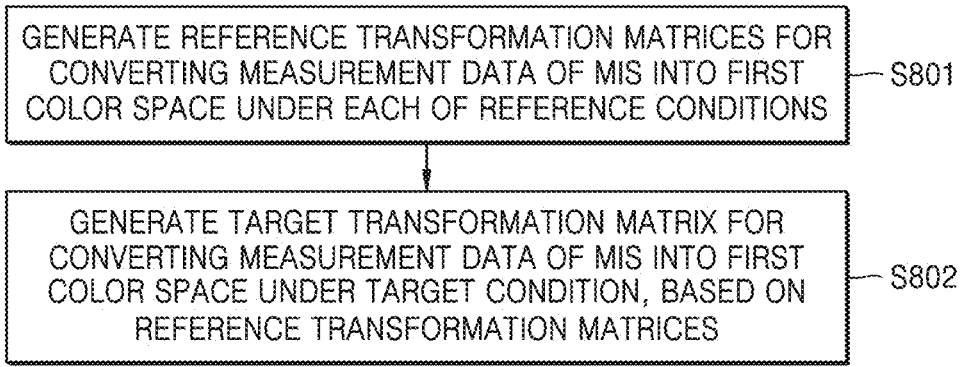
FIG. 8 is a flowchart of a method of converting measurement data acquired by a MIS into a color space under arbitrary conditions according to an example embodiment.

FIG. 8 is a flowchart of a method of converting measurement data acquired by of a MIS into a color space under arbitrary conditions according to an example embodiment.

In operation S801, a processor may generate reference transformation matrices configured to convert the measurement data acquired by the MIS into a first color space under each of reference conditions.

The first color space may be an absolute color space. For example, the first color space may be a CIE XYZ color space, but is not limited thereto.

The reference condition may represent an environment in which the MIS acquired the measurement data or a subject that the MIS captured. For example, when the MIS acquired the measurement data under a neon sign, the reference condition may be 'Environment: Neon Sign'. According to another example embodiment, when the MIS acquires the measurement data by capturing a TV, the reference condition may be 'Subject: TV'. According to another example embodiment, when the MIS acquires the measurement data under an indoor illuminant, the reference condition may be 'Environment: Indoor illuminant'. A list of reference conditions may be predetermined by a user.

A reference transformation matrix may be a transformation matrix configured to convert the measurement data acquired by the MIS acquired under the reference condition into the first color space.

In operation S802, the processor may generate a target transformation matrix configured to convert the measurement data acquired by the MIS into the first color space under a target condition, based on the reference transformation matrices.

The processor may analyze the measurement data acquired by the MIS and determine the target condition corresponding to an environment in which the MIS acquired the measurement data or a subject that the MIS captured. Machine learning, such as deep learning, may be used to analyze measurement data acquired by the MIS and determine the target condition. For example, the processor may analyze that the subject is a TV from the measurement data acquired by the MIS and determine the target condition as 'Subject: TV'.

The processor may set the reference transformation matrix of the same reference conditions as the determined target condition as a target transformation matrix.

Operations S801 and S802 may be performed by one electronic device. For example, operations S801 and S802 may be performed by the second electronic device 200 of FIG. 2. According to another example embodiment, operations S801 and S802 may be respectively performed by different electronic devices. For example, operation S801 may be performed by the first electronic device 100 of FIG. 1, and operation S802 may be performed by the second electronic device 200 of FIG. 2.

Figure 9:
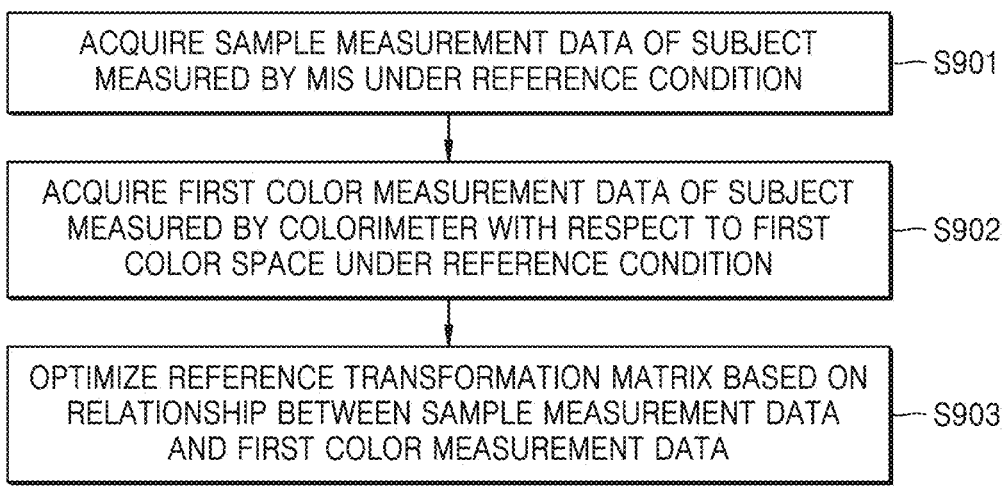
FIG. 9 is a flowchart of a method of generating a reference transformation matrix according to an example embodiment.

FIG. 9 is a flowchart of a method of generating a reference transformation matrix according to an example embodiment.

A processor may generate reference transformation matrices by performing operations S901 to S903 with respect to different reference conditions, respectively. The method of generating the reference transformation matrix with respect to one of different reference conditions is described.

In operation S901, the processor may acquire sample measurement data of a subject measured by a MIS under a reference condition.

For example, when the MIS captures a TV, the processor may acquire measurement data acquired by the MIS as the sample measurement data.

In operation S902, the processor may acquire first color measurement data of a subject measured by a colorimeter with respect to a first color space under the reference condition.

The first color space may be an absolute color space. For example, the first color space may be a CIE XYZ or ICtCp color space, but is not limited thereto. The colorimeter may measure the same subject as the subject in operation S901 under the same reference condition as the reference condition in operation S901.

In operation S903, the processor may optimize the reference transformation matrix based on the relationship between the sample measurement data and the first color measurement data.

The processor may optimize the reference transformation matrix such that a difference between the sample measurement data and the first color measurement data on a second color space is minimized. For example, the second color space is a color space different from the first color space, and may be a color space that is optically more uniformly distributed than the first color space. For example, the second color space may be a CIE Lab or DE2000 color space, but is not limited thereto.

The description of FIG. 5 may be applied to operation S903 in which the processor optimizes the reference transformation matrix.

Figure 11:
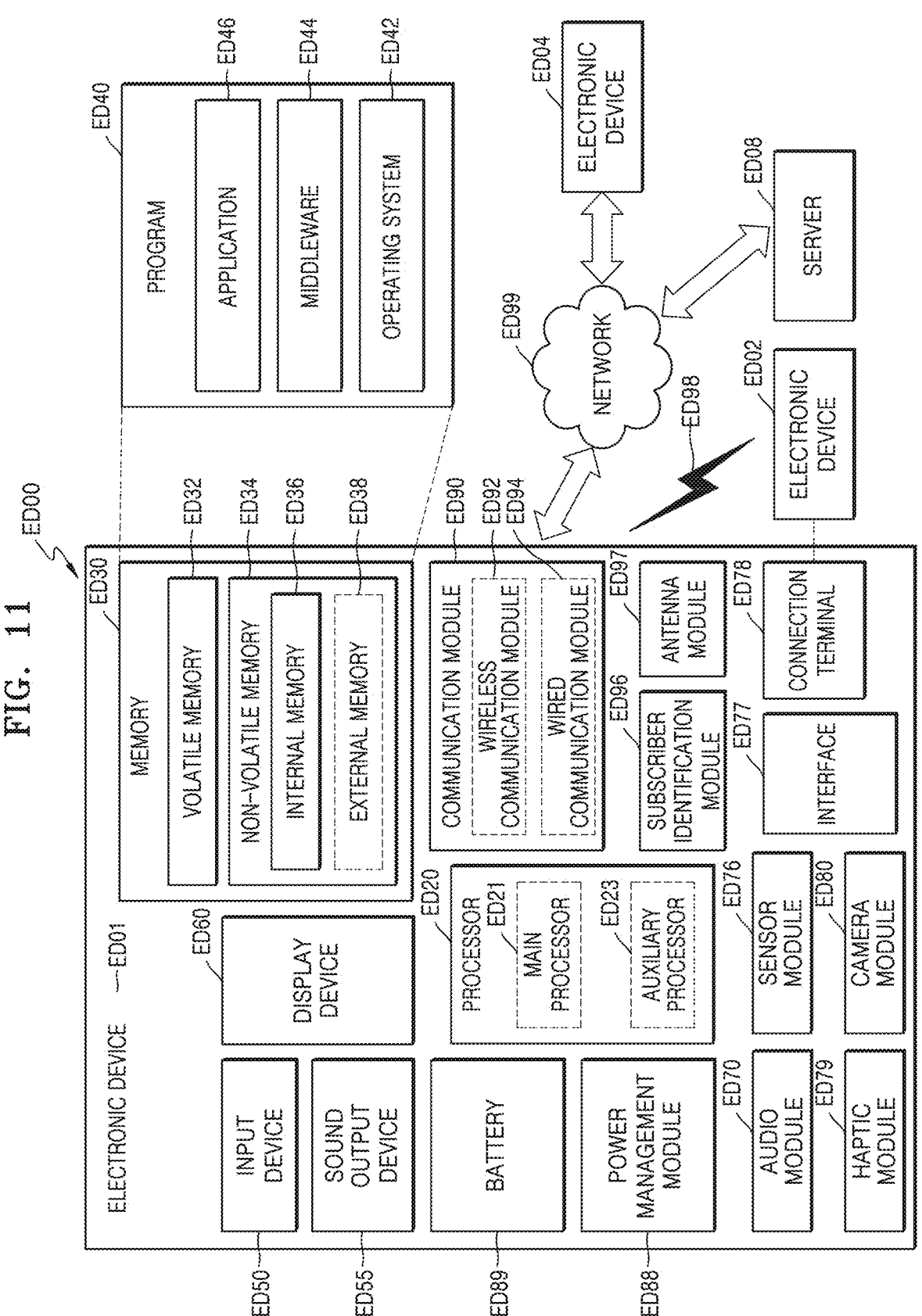
FIG. 11 is a block diagram showing a schematic structure of an electronic device according to an example embodiment.

FIG. 11 is a block diagram showing a schematic structure of an electronic device ED01 according to an example embodiment.

Referring to FIG. 11, in a network environment ED00, the electronic device ED01 may communicate with another electronic device ED02 via a first network ED98 (short-range wireless communication network, etc.), or may communicate with another electronic device ED04 and/or a server ED08 via a second network ED99 (long-range wireless communication network, etc.) The electronic device ED01 may communicate with the electronic device ED04 via the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (display device ED60, etc.) of the components may be omitted or another component may be added. Some of the components may be configured as one integrated circuit. For example, the sensor module ED76 (a fingerprint sensor, an iris sensor, an illuminance sensor, etc.) may be embedded and implemented in the display device ED60 (display, etc.) In addition, when an MIS includes a spectral function, some functions of the sensor module (color sensor, illuminance sensor) may be implemented in the MIS itself rather than in a separate sensor module.

The processor ED20 may control one or more components (hardware, software components, etc.) of the electronic device ED01 connected to the processor ED20 by executing software (program ED40, etc.), and may perform various data processes or operations. As a part of the data processing or operations, the processor ED20 may load a command and/or data received from another component (sensor module ED76, communication module ED90, etc.) to a volatile memory ED32, may process the command and/or data stored in the volatile memory ED32, and may store result data in a non-volatile memory ED34. The processor ED20 may include a main processor ED21 (central processing unit, application processor, etc.) and an auxiliary processor ED23 (graphic processing unit, image signal processor, sensor hub processor, communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (sleep state) or along with the main processor ED21 while the main processor ED21 is in an active state (application executed state), may control functions and/or states related to some (display device ED60, sensor module ED76, communication module ED90, etc.) of the components in the electronic device ED01. The auxiliary processor ED23 (image signal processor, communication processor, etc.) may be implemented as a part of another component (camera module ED80, communication module ED90, etc.) that is functionally related thereto.

The memory ED30 may store various data required by the components (processor ED20, sensor module ED76, etc.) of the electronic device ED01. The data may include, for example, input data and/or output data about software (program ED40, etc.) and commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored as software in the memory ED30, and may include an operation system ED42, middleware ED44, and/or an application ED46.

The input device ED50 may receive commands and/or data to be used in the components (processor ED20, etc.) of the electronic device ED01, from outside (user, etc.) of the electronic device ED01. The input device ED50 may include a microphone, a mouse, a keyboard, and/or a digital pen (stylus pen).

The sound output device ED55 may output a sound signal to outside of the electronic device ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic device ED01. The display device ED60 may include a display, a hologram device, or a projector, and a control circuit for controlling the corresponding device. The display device ED60 may include a touch circuitry set to sense a touch, and/or a sensor circuit (pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic device (electronic device ED02, etc.) connected directly or wirelessly to the electronic device ED01.

The sensor module ED76 may sense an operating state (power, temperature, etc.) of the electronic device ED01, or an outer environmental state (user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic device ED01 to be directly or wirelessly connected to another electronic device (electronic device ED02, etc.) The interface ED77 may include a high-definition multimedia interface (HDMI), a universal serial bus (USB) interface, an SD card interface, and/or an audio interface.

The connection terminal ED78 may include a connector by which the electronic device ED01 may be physically connected to another electronic device (electronic device ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include the MIS described above, an additional lens assembly, image signal processors, and/or flashes. The lens assembly included in the camera module ED80 may collect light emitted from a subject that is an object to be captured.

The power management module ED88 may manage the power supplied to the electronic device ED01. The power management module ED88 may be implemented as a part of a power management integrated circuit (PMIC).

The battery ED89 may supply electric power to components of the electronic device ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic device ED01 and another electronic device (electronic device ED02, the electronic device ED04, the server ED08, etc.), and execution of communication through the established communication channel. The communication module ED90 may be operated independently from the processor ED20 (application processor, etc.), and may include one or more communication processors that support the direct communication and/or the wireless communication. The communication module ED90 may include a wireless communication module ED92 (cellular communication module, a short-range wireless communication module, a global navigation satellite system (GNSS) communication module) and/or a wired communication module ED94 (local area network (LAN) communication module, a power line communication module, etc.). From among the communication modules, a corresponding communication module may communicate with another electronic device via a first network ED09 (short-range communication network such as Bluetooth, WiFi direct, or infrared data association (IrDA)) or a second network ED99 (long-range communication network such as a cellular network, Internet, or computer network (LAN, WAN, etc.)). Such above various kinds of communication modules may be integrated as one component (single chip, etc.) or may be implemented as a plurality of components (a plurality of chips) separately from one another. The wireless communication module ED92 may identify and authenticate the electronic device ED01 in a communication network such as the first network ED98 and/or the second network ED99 by using subscriber information (international mobile subscriber identifier (IMSI), etc.) stored in the subscriber identification module ED96.

The antenna module ED97 may transmit or receive the signal and/or power to/from outside (another electronic device, etc.) An antenna may include a radiator formed as a conductive pattern formed on a substrate (PCB, etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic device via the selected antenna. Another component (RFIC, etc.) other than the antenna may be included as a part of the antenna module ED97.

Some of the components may be connected to one another via the communication method among the peripheral devices (bus, general purpose input and output (GPIO), serial peripheral interface (SPI), mobile industry processor interface (MIPI), etc.) and may exchange signals (commands, data, etc.).

The command or data may be transmitted or received between the electronic device ED01 and the external electronic device ED04 via the server ED08 connected to the second network ED99. Other electronic devices ED02 and ED04 may be the devices that are the same as or different kinds from the electronic device ED01. All or some of the operations executed in the electronic device ED01 may be executed in one or more devices among the other electronic devices ED02, ED04, and ED08. For example, when the electronic device ED01 has to perform a certain function or service, the electronic device ED01 may request one or more other electronic devices to perform some or entire function or service, instead of executing the function or service by itself. One or more electronic devices receiving the request execute an additional function or service related to the request and may transfer a result of the execution to the electronic device ED01. To do this, for example, a cloud computing, a distributed computing, or a client-server computing technique may be used.

Figure 12:
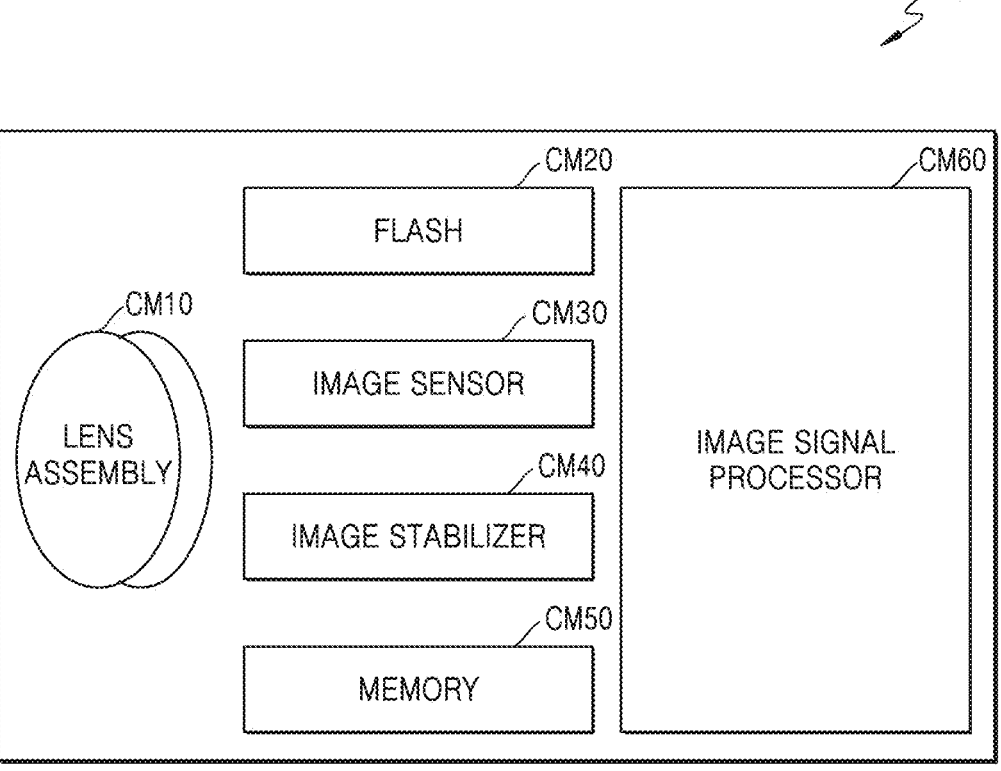
FIG. 12 is a block diagram schematically illustrating a camera module provided in the electronic device of FIG. 11.

FIG. 12 is a block diagram schematically showing the camera module ED80 provided in the electronic device ED01 of FIG. 11. The camera module ED80 may include the image acquisition device 1000 described above, or may have a structure modified therefrom. Referring to FIG. 12, the camera module ED80 may include a lens assembly CM10, a flash CM20, an image sensor CM30, an image stabilizer CM40, a memory CM50 (a buffer memory, etc.), and/or an image signal processor CM60.

The image sensor CM30 may include the MIS described above. The MIS may convert light emitted or reflected from the subject and transmitted through the lens assembly CM10 into electrical signals, thereby acquiring an image corresponding to the subject. The MIS may acquire a hyperspectral image in an ultraviolet to infrared wavelength range.

The image sensor CM30 may include one or a plurality of sensors selected from image sensors having different attributes such as an RGB sensor, a black and white (BW) sensor, an IR sensor, or UV sensor, in addition to the MIS described above. Each sensor included in the image sensor CM30 may be implemented by a CCD sensor and/or a CMOS sensor.

The lens assembly CM10 may collect light emitted from a subject for image capturing. The camera module ED80 may include a plurality of lens assemblies CM10, and in this case, the camera module ED80 may include a dual camera, a 360 degrees camera, or a spherical camera. Some of the lens assemblies CM10 may have the same lens attributes (a viewing angle, a focal length, auto focus, F Number, optical zoom, etc.), or different lens attributes. The lens assembly CM10 may include a wide angle lens or a telescopic lens.

The lens assembly CM10 may be configured and/or focus controlled so that two image sensors included in the image sensor CM30 may form an optical image of a subject at the same position.

The flash CM20 may emit light used to reinforce light emitted or reflected from a subject. The flash CM20 may include one or a plurality of light-emitting diodes (a red-green-blue (RGB) LED, a white LED, an infrared LED, an ultraviolet LED, etc.), and/or a xenon lamp.

The image stabilizer CM40, in response to a motion of the camera module ED80 or the electronic device ED01 including the camera module ED80, moves one or more lenses included in the lens assembly CM10 or the MIS in a certain direction or controls the operating characteristics of the MIS (adjusting of a read-out timing, etc.) in order to compensate for a negative influence of the motion. The image stabilizer CM40 may sense the movement of the camera module ED80 or the electronic device ED01 by using a gyro sensor (not shown) or an acceleration sensor (not shown) arranged in or out of the camera module ED80. The image stabilizer CM40 may be implemented as an optical type.

The memory CM50 may store a part or entire data of an image acquired through the MIS for a subsequent image processing operation. For example, when a plurality of images are acquired at high speed, only low resolution images are displayed while the acquired original data (Bayer-Patterned data, high resolution data, etc.) is stored in the memory CM50. Then, the memory CM50 may be used to transmit the original data of a selected (user selection, etc.) image to the image signal processor CM60. The memory CM50 may be incorporated into the memory ED30 of the electronic device ED01, or configured to be an independently operated separate memory.

The image signal processor CM60 may perform image processing on the image acquired through the image sensor CM30 or the image data stored in the memory CM50. The configuration of the processor 500 for this may be included in the image signal processor CM60.

The image processing may include depth map generation, three-dimensional modeling, panorama generation, feature point extraction, image synthesis, and/or image compensation (noise reduction, resolution adjustment, brightness adjustment, blurring, sharpening, softening, etc.) The image signal processor CM60 may perform control (exposure time control, or read-out timing control, etc.) on constituent elements (the image sensor CM30, etc.) included in the camera module ED80. The image processed by the image signal processor CM60 may be stored again in the memory CM50 for additional processing or provided to external constituent elements (the memory ED30, the display device ED60, the electronic device ED02, the electronic device ED04, the server ED08, etc.) of the camera module ED80. The image signal processor CM60 may be incorporated into the processor ED20, or configured to be a separate processor operated independently of the processor ED20. When the image signal processor CM60 is configured by a separate processor from the processor ED20, the image processed by the image signal processor CM60 may undergo additional image processing by the processor ED20 and then displayed through the display device ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

FIGS. 13 to 22 show various examples of electronic devices to which a MIS is applied according to example embodiments.

Figure 13:
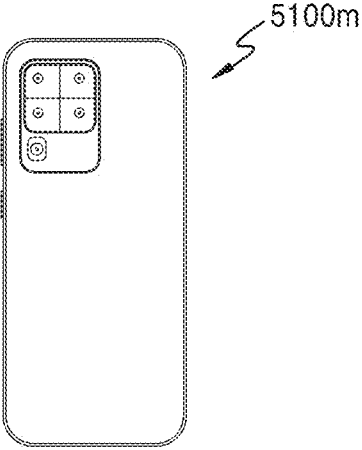
FIGS. 13, 14, 15, 16, 17, 18, 19, 20, 21, and 22 show various examples of electronic devices to which a MIS is applied according to example embodiments.
Figure 14:
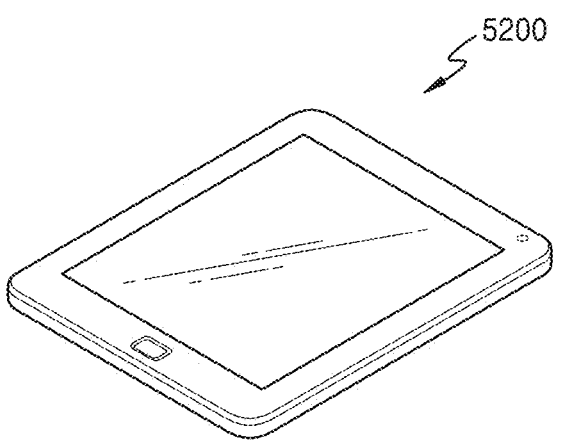
Figure 15:
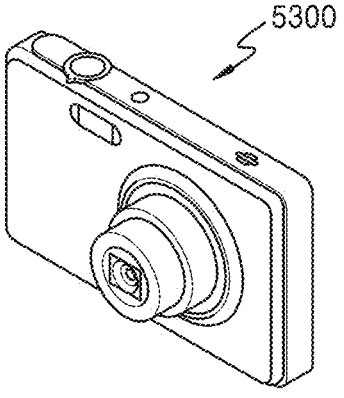
Figure 16:
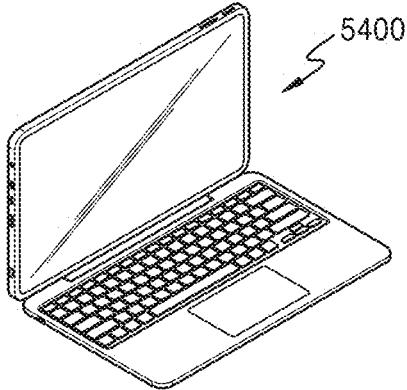
Figure 17:
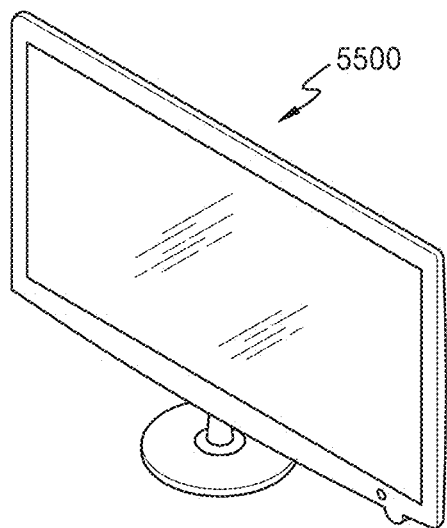

The MIS may be applied to a mobile phone or smart phone 5100m illustrated in FIG. 13, a tablet or smart tablet 5200 illustrated in FIG. 14, a digital camera or camcorder 5300 illustrated in FIG. 15, a notebook computer 5400 illustrated in FIG. 16, a television or smart television 5500 illustrated in FIG. 17, etc. For example, the smart phone 5100m or the smart tablet 5200 may include a plurality of high resolution cameras, each having a high resolution image sensor mounted thereon. Depth information of subjects in an image may be extracted by using high resolution cameras, out focusing of the image may be adjusted, or subjects in the image may be automatically identified.

Figure 18:
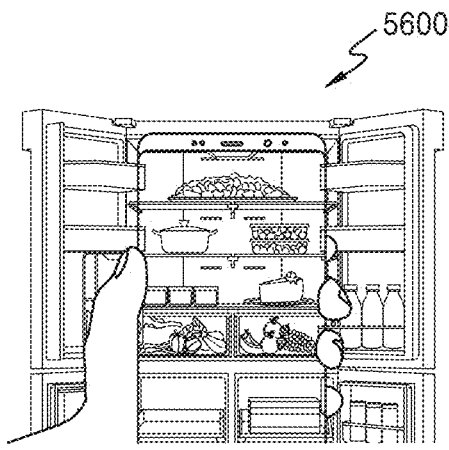
Figure 19:
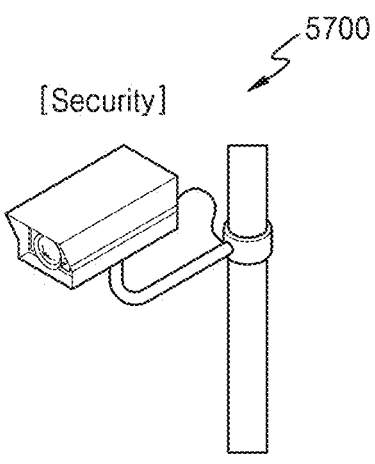
Figure 20:
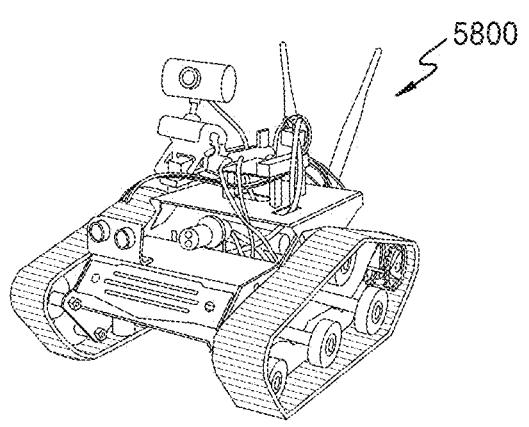
Figure 21:
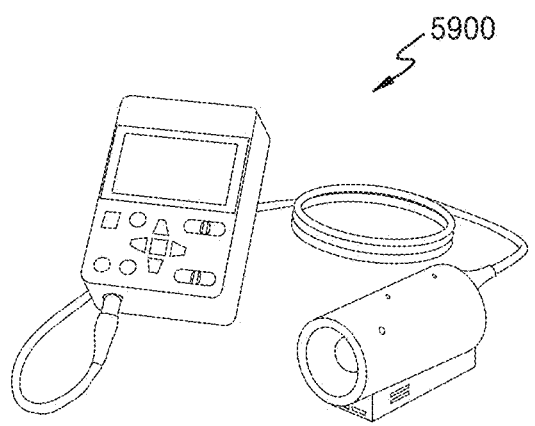

Furthermore, the MIS may be applied to a smart refrigerator 5600 illustrated in FIG. 18, a security camera 5700 illustrated in FIG. 19, a robot 5800 illustrated in FIG. 20, a medical camera 5900 illustrated in FIG. 21, etc. For example, the smart refrigerator 5600 may automatically recognize food in a refrigerator, by using the MIS, and notify a user of the presence of a particular food, the type of food that is input or output, and the like, through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high-resolution image. The medical camera 5900 may provide a high-resolution image for diagnosis or surgery, and thus a field of vision may be dynamically adjusted.

Figure 22:
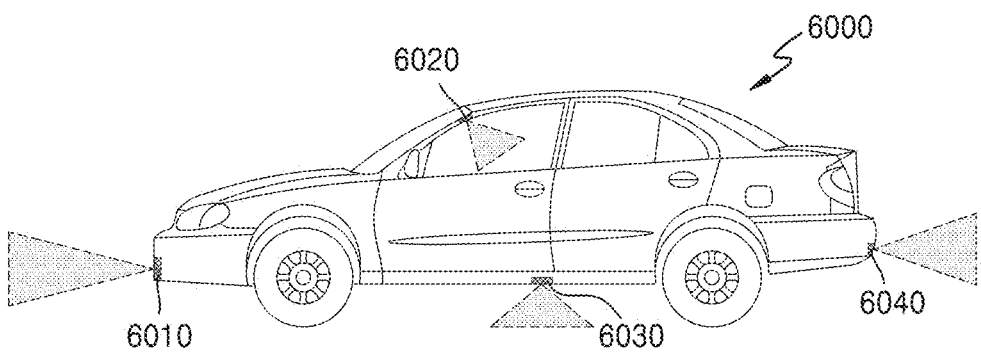

Furthermore, the MIS may be applied to a vehicle 6000 as illustrated in FIG. 22. The vehicle 6000 may include a plurality of vehicle cameras 6010, 6020, 6030, and 6040 arranged at various positions. Each of the vehicle cameras 6010, 6020, 6030, and 6040 may include the MIS according to an embodiment. The vehicle 6000 may provide a driver with various pieces of information about the inside or periphery of the vehicle 6000, by using the vehicle cameras 6010, 6020, 6030, and 6040, thereby providing an object or a person in an image may be automatically recognized and information needed for autonomous driving.

The method described above may be recorded in a computer-readable non-transitory recording medium in which one or more programs including instructions for executing the method are recorded. Examples of computer-readable recording media include magnetic media, such as hard disks, floppy disks, and magnetic tapes, optical media, such as CD-ROMs and DVDs, magneto-optical media, such as floptical disks, and hardware devices, such as ROMs, RAMs, and flash memories, which are particularly configured to store and perform program instructions. Examples of program instructions include machine language codes, such as those produced by compilers, as well as advanced language codes that may be executed by computers using interpreters, etc.

It should be understood that embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A computer-implemented method of converting measurement data obtained by a multispectral image sensor (MIS) into a color space based on an arbitrary correlated color temperature (CCT), the computer-implemented method comprising:

obtaining reference transformation matrices configured to convert the measurement data obtained by the MIS into a first color space based on each of reference CCTs; and based on the reference transformation matrices, obtaining a target transformation matrix configured to convert the measurement data obtained by the MIS into the first color space based on a target CCT different from the reference CCTs, wherein the obtaining of the reference transformation matrices comprises:

obtaining sample measurement data of color samples measured by the MIS based on a reference CCT among the reference CCTs;

obtaining first color measurement data of the color samples measured by a colorimeter with respect to the first color space based on the reference CCT;

optimizing a reference transformation matrix based on a relationship between the sample measurement data and the first color measurement data; and normalizing the optimized reference transformation matrix, wherein a loss function for the optimizing comprises a regularization term based on a size of the reference transformation matrix.

2. The computer-implemented method of claim 1, wherein the optimizing of the reference transformation matrix comprises:

obtaining an initial value of the reference transformation matrix based on the relationship between the first color measurement data and the sample measurement data;

obtaining first color prediction data by converting the sample measurement data into the first color space based on the initial value of the reference transformation matrix;

obtaining second color measurement data and second color prediction data by converting the first color measurement data and the first color prediction data into a second color space, respectively; and optimizing the reference transformation matrix to minimize a difference between the second color measurement data and the second color prediction data.

3. The computer-implemented method of claim 1, wherein the regularization term corresponds to one of an L1-norm of the reference transformation matrix and an L2-norm of the reference transformation matrix.

4. The computer-implemented method of claim 1, wherein the normalizing of the optimized reference transformation matrix comprises:

obtaining single measurement data of one of the color samples measured by the MIS based on the reference CCT;

normalizing the single measurement data; and normalizing the reference transformation matrix based on the normalized single measurement data.

5. The computer-implemented method of claim 4, wherein the single measurement data comprises data of a brightest achromatic sample among the color samples measured by the MIS based on the reference CCT.

6. The computer-implemented method of claim 4, wherein the normalizing of the single measurement data comprises adjusting a size of the single measurement data such that a maximum value of elements of the single measurement data is 1.

7. The computer-implemented method of claim 4, wherein the normalizing of the reference transformation matrix based on the normalized single measurement data comprises adjusting a size of the reference transformation matrix such that data obtained by converting the normalized single measurement data into the first color space satisfies a predetermined condition.

8. The computer-implemented method of claim 7, wherein the first color space is a Commission Internationale de l'Elcairage (CIE) XYZ color space, and wherein the adjusting of the size of the reference transformation matrix comprises adjusting the size of the reference transformation matrix such that a Y value of data obtained by converting the normalized single measurement data into the CIE XYZ color space is 1.

9. The computer-implemented method of claim 1, wherein the obtaining of the target transformation matrix comprises, based on the relationship between each of the reference CCTs and the target CCT, obtaining the target transformation matrix by interpolating the reference transformation matrices.

10. The computer-implemented method of claim 1, wherein the obtaining of the target transformation matrix comprises, among the reference CCTs, setting a reference transformation matrix of the reference CCT closest to the target CCT as the target transformation matrix.

11. A computer-implemented method of converting measurement data obtained by a multispectral image sensor (MIS) into a color space based on an arbitrary correlated color temperature (CCT), the computer-implemented method comprising:

obtaining sample measurement data of color samples measured by the MIS based on a reference CCT;

obtaining first color measurement data of the color samples measured by a colorimeter with respect to a first color space based on the reference CCT;

optimizing a reference transformation matrix based on a relationship between the sample measurement data and the first color measurement data; and normalizing the optimized reference transformation matrix, wherein a loss function for the optimizing comprises a regularization term based on a size of the reference transformation matrix.

12. The computer-implemented method of claim 11, wherein the optimizing of the reference transformation matrix comprises:

obtaining an initial value of the reference transformation matrix based on the relationship between the first color measurement data and the sample measurement data;

obtaining first color prediction data by converting the sample measurement data into the first color space based on the initial value of the reference transformation matrix;

obtaining second color measurement data and second color prediction data by converting the first color measurement data and the first color prediction data into a second color space, respectively; and optimizing the reference transformation matrix to minimize a difference between the second color measurement data and the second color prediction data.

13. The computer-implemented method of claim 11, wherein the regularization term corresponds to one of an L1-norm of the reference transformation matrix and an L2-norm of the reference transformation matrix.

14. The computer-implemented method of claim 11, wherein the normalizing of the optimized reference transformation matrix comprises:

obtaining single measurement data of one of the color samples measured by the MIS based on the reference CCT;

normalizing the single measurement data; and normalizing the reference transformation matrix based on the normalized single measurement data.

15. The computer-implemented method of claim 14, wherein the normalizing of the reference transformation matrix based on the normalized single measurement data comprises adjusting a size of the reference transformation matrix such that data obtained by converting the normalized single measurement data into the first color space satisfies a predetermined condition.

16. An electronic device configured to convert measurement data obtained by a multispectral image sensor (MIS) into a color space based on an arbitrary correlated color temperature (CCT), the electronic device comprising:

a memory configured to store one or more instructions; and a processor configured to execute the one or more instructions to:

obtain sample measurement data of color samples measured by the MIS based on a reference CCT;

obtain first color measurement data of the color samples measured by a colorimeter with respect to a first color space based on the reference CCT;

optimize a reference transformation matrix based on a relationship between the sample measurement data and the first color measurement data; and normalize the optimized reference transformation matrix, wherein a loss function for the optimizing comprises a regularization term based on a size of the reference transformation matrix.

17. The electronic device of claim 16, wherein the processor is further configured to:

obtain an initial value of the reference transformation matrix based on the relationship between the first color measurement data and the sample measurement data;

obtain first color prediction data by converting the sample measurement data into the first color space based on the initial value of the reference transformation matrix;

obtain second color measurement data and second color prediction data by converting the first color measurement data and the first color prediction data into a second color space respectively; and optimize the reference transformation matrix to minimize a difference between the second color measurement data and the second color prediction data.

18. The electronic device of claim 16, wherein the regularization term corresponds to one of an L1-norm of the reference transformation matrix and an L2-norm of the reference transformation matrix.

19. The electronic device of claim 16, wherein the processor is further configured to:

obtain single measurement data of one of the color samples measured by the MIS based on the reference CCT;

normalize the single measurement data; and normalize the reference transformation matrix based on the normalized single measurement data.

20. The electronic device of claim 19, wherein the processor is further configured to adjust a size of the reference transformation matrix such that data obtained by converting the normalized single measurement data into the first color space satisfies a predetermined condition.

* * * * *